(12) United States Patent
Woskov et al.

(10) Patent No.: US 6,509,968 B1
(45) Date of Patent: Jan. 21, 2003

(54) SPECTROSCOPIC DETECTION

(75) Inventors: Paul P. Woskov, Bedford, MA (US); Kamal Hadidi, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/572,277

(22) Filed: May 17, 2000

(51) Int. Cl.[7] .............................. G01J 3/02; G01J 3/28
(52) U.S. Cl. ............................ 356/307; 356/328
(58) Field of Search ................... 356/307, 326, 356/328

(56) References Cited

U.S. PATENT DOCUMENTS

| | | | | |
|---|---|---|---|---|
| 2,734,418 A | * | 2/1956 | Enns | 356/307 |
| 4,752,129 A | | 6/1988 | Izumi et al. | 356/328 |
| 5,675,411 A | | 10/1997 | Brooks et al. | 356/328 |
| 5,815,261 A | | 9/1998 | Brooks et al. | 356/310 |

FOREIGN PATENT DOCUMENTS

| | | | |
|---|---|---|---|
| FR | 2 590 979 | 6/1987 | |
| JP | 58-187837 | * 11/1983 | 356/307 |

OTHER PUBLICATIONS

Woskov et al., "Spectroscopic diagnostics of an atmospheric microwave plasma for monitoring metals pollution," *American Institute of Physics*, Jan., 1999, 70:489–492.

* cited by examiner

Primary Examiner—F. L. Evans
(74) Attorney, Agent, or Firm—Fish & Richardson P.C.

(57) ABSTRACT

In embodiments, spectroscopic monitor monitors modulated light signals to detect low levels of contaminants and other compounds in the presence of background interference. The monitor uses a spectrometer that includes a transmissive modulator capable of causing different frequency ranges to move onto and off of the detector. The different ranges can include those with the desired signal and those selected to subtract background contributions from those with the desired signal. Embodiments of the system are particularly useful for monitoring metal concentrations in combustion effluent.

55 Claims, 8 Drawing Sheets

SPECTROSCOPIC DETECTION

This invention was made with government support under Grant Number DE-FG07-98ID13601 awarded by the U.S. Department of Energy. The government has certain rights in the invention.

BACKGROUND OF THE INVENTION

This invention relates to spectroscopic detection.

In one application, spectroscopic monitoring devices monitor emissions from industrial smokestacks for the presence of toxic species that pose a health threat to humans. In particular, these devices monitor the level of metals, e.g., mercury, lead, arsenic, beryllium, cadmium, and chromium, emitted by thermal processes such as waste incineration, fossil fuel burning power plants, chemical manufacturing, and metals refining.

Spectroscopic monitors are also used in environmental and industrial processing and testing applications to tests samples, e.g., water and gas, for trace amounts of elements or compounds. For example, spectroscopic monitors are used in combination with plasma systems such as inductively coupled plasma (ICP) and microwave-sustained plasma to detect trace amounts of metals by atomic emission spectroscopy.

SUMMARY OF THE INVENTION

In an aspect, the invention features a spectroscopic device including dispersing optics for dispersing electromagnetic radiation, a detector for measuring electromagnetic radiation, a transmissive rotating blade for causing alternate frequency ranges of the electromagnetic radiation to move onto and off of the detector, and detector electronics for monitoring an electromagnetic radiation signal at a first frequency range while correcting a background contribution using an electromagnetic radiation signal at a second frequency range.

In another aspect, the invention features a spectroscopic device including dispersing optics for dispersing electromagnetic radiation, a detector for measuring electromagnetic radiation, a reflective rotating blade before the dispersing optics for causing electromagnetic radiation to move onto and off of the detector, an attenuator between the reflective rotating blade and the detector for controlling the intensity of the electromagnetic radiation directed onto the detector, and detector electronics for monitoring an electromagnetic radiation signal at a first frequency range while correcting a background contribution using an electromagnetic radiation at a second frequency range.

In still another aspect, the invention features a spectroscopic device including dispersing optics for dispersing electromagnetic radiation, a detector for measuring the electromagnetic radiation, a movable transmissive element having different portions for causing, by a difference in the refraction between the different portions, alternate frequency ranges of the electromagnetic radiation incident on the different portions to move on to and off of the detector, and detector electronics for monitoring an electromagnetic radiation signal at a first frequency range while correcting a background contribution using an optical signal at a second frequency range.

Embodiments may also include one or more of the following features. The transmissive rotating blade, reflective rotating blade, or movable transmissive element includes a first portion and a second portion having different thicknesses. The first and the second portions have the same or different refractive indices. The transmissive rotating blade, reflective rotating blade, or movable transmissive element includes material free portions which pass electromagnetic radiation without refraction. At least a portion of the transmissive rotating blade is formed of quartz. The transmissive rotating blade includes multiple stacked quartz sections of different shapes to create regions of the blade having different thicknesses. The detector electronics include a lock-in amplifier. The detector electronics further include a sensor configured to measure the frequency at which the transmissive rotating blade, reflective rotating blade, or movable transmissive element moves the alternate frequency ranges onto and off of the detector. The lock-in amplifier is configured to receive electric signals from the sensor and the detector. The spectroscopic device further includes a transfer line configured to transmit the electromagnetic radiation from a radiation source to the dispersing optics. The transmissive rotating blade, reflective rotating blade, or movable transmissive element rotates at a frequency sufficient to reduce the background contribution. The electromagnetic radiation signal at the first frequency range includes contributions from contaminant emission and background emission. The electromagnetic radiation signal at the second frequency range includes contributions from background emission. The spectroscopic device further includes an emission spectrum generator. The spectroscopic device is arranged to receive electromagnetic radiation from combustion effluent. The spectroscopic device is arranged to detect electromagnetic radiation emitted from metals.

The invention also features the modulators themselves and methods of spectroscopic detection and monitoring as discussed below.

Embodiments may include one or more of the following advantages. In embodiments, the invention features monitoring modulated light signals to detect low levels of contaminants and other compounds in the presence of background interference. The spectroscopic monitor can extract low-level signals of contaminants from high-level background signals by modulating the light signals and monitoring them with frequency sensitive detection. The spectroscopic monitor can cancel out changes and drift in the background signal by continuously measuring the low-level signals relative to high-level background signal. Canceling drift or changes in the background signal increases the signal-to-noise ratio of the monitoring signal and reduces the uncertainty associated with quantifying the absolute amount of contaminant present in a sample. In embodiments, the spectroscopic monitor increases the detection limit significantly in situations where there is interfering background emission and can measure the amount of contaminants at detection limits lower than 1 $\mu g/m^3$. Detecting elements or compounds at low levels is important in a number of areas such as forensic sciences, environmental sciences, food sciences, pollution monitoring, and the chemical and pharmaceutical industries. In particular, the spectroscopic monitor can be used for environmental compliance monitoring, to test the purity of food, medicines, and new bio-engineered products by quantifying the level of contaminants.

The dispersing optics of the spectroscopic monitor are substantially stationary and are less prone to misalignment. As a result, the spectroscopic monitor is robust and can be used in a wide variety of harsh environments, e.g., in monitoring emissions from industrial smokestacks.

Other features, aspects and advantages follow.

DESCRIPTION OF THE PREFERRED EMBODIMENTS

Figure 1:
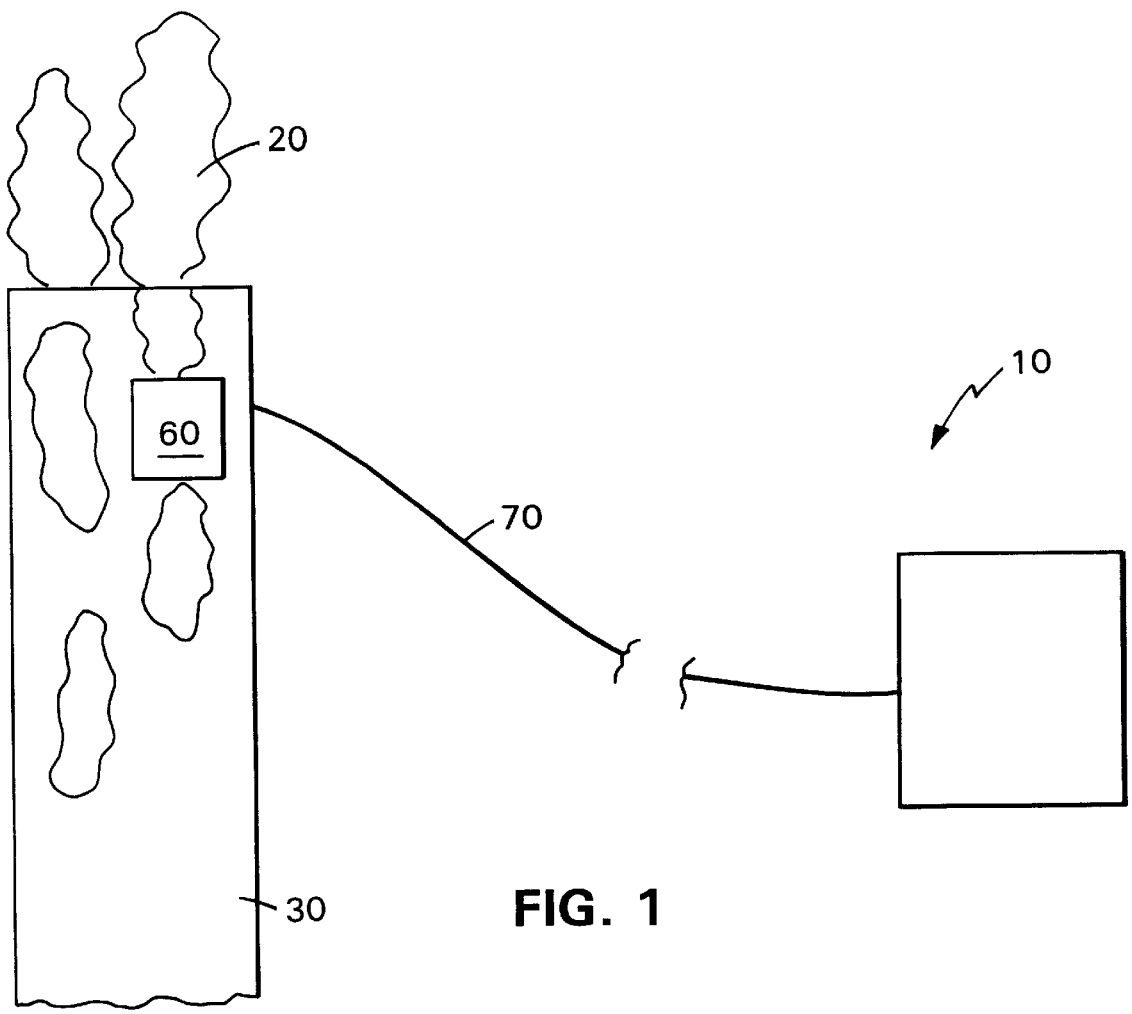
FIG. 1 is a schematic of monitoring a smoke stack.
Figure 2:
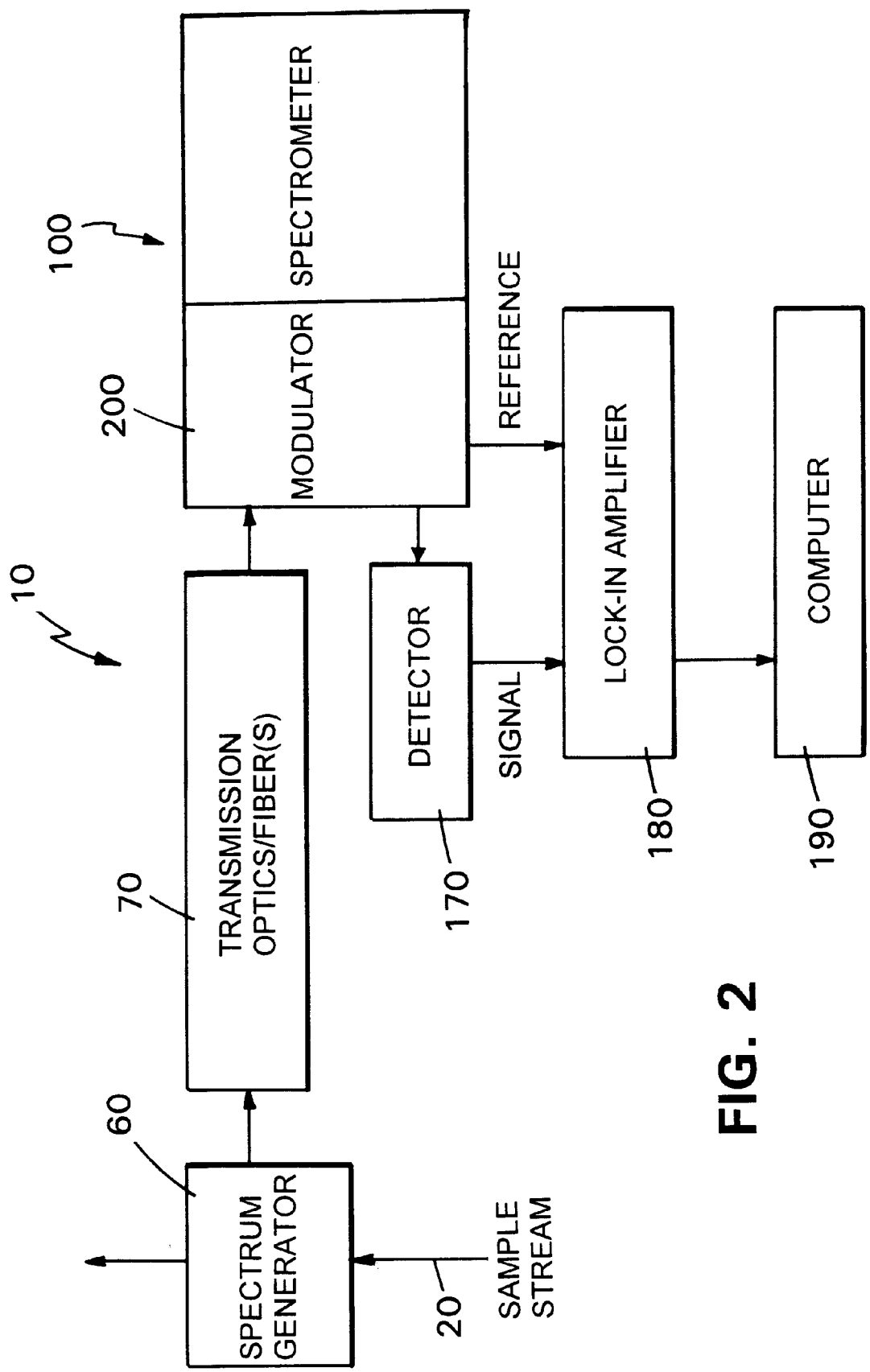
FIG. 2 is a schematic of a monitoring system.

Referring to FIGS. 1 and 2, a monitoring apparatus 10 monitors emission spectra of a sample stream 20, such as effluent from a smokestack 30, for the presence of contaminants, e.g., elements, compounds or particulates. Emission spectra of sample stream 20 are generated by passing sample stream 20 through a spectrum generator 60 to produce a light signal, encoded with spectroscopic information about sample stream 20, which is passed through a transmission line 70, e.g., lenses, mirrors, and/or fiber optic cables, and monitored by a spectrometer 100. Spectrum generator 60 generates the light signal by spectroscopic methods, including but not limited to, electronic plasmas, flame combustion, and laser induced fluorescence. An example of an electronic plasma can be found in "Spectroscopic Diagnostics of an Atmosphere Microwave Plasma for Monitoring Metals Pollution," by Woskov et al. and published in Review of Scientific Instruments 70:489–492 (1999), the entire contents of which is incorporated herein by reference.

Spectrometer 100 disperses the light signal as a function of wavelength such that a detector 170, e.g., a photomultiplier tube, measures specific wavelengths of the light signal to monitor the sample stream for the presence of different contaminants. A modulator 200 increases the sensitivity at which detector 170 monitors the contaminants by sequentially alternating specific wavelengths onto and off of detector 170. In particular, detector 170 views spectral wavelength ranges with and without contaminant emission. Detector 170 converts the modulated optical signals into modulated electronic signals which are sent to a lock-in amplifier 180. Lock-in amplifier 180 also receives a reference electronic signal from modulator 200 to indicate the modulating cycle or frequency at which modulator 200 alternates specific wavelengths onto or off of detector 170. Lock-in amplifier 180 uses the reference signal to generate a difference signal from the electronic modulated signal that is, typically, linearly proportional to the amount of the contaminant in the sample stream. The difference signal is sent to computer 190 for further analysis, e.g., calculating the absolute amount of particular contaminants present in the sample stream as a function of time.

As will be described in greater detail below, the encoded light signal is the sum of a broad background signal produced from spectrum generator 60 and discrete emission from the contaminants of stream 20. Typically, the intensity of the broad background signal continuously varies thereby adding uncertainty to measurements used to monitor the discrete emission from the contaminants. Examples of contaminants include, but are not limited to, metals such as mercury, lead, arsenic, beryllium, cadmium, and chromium. Of course, the contaminant can be any element, compound, or composition that emits a characteristic light signal when passed through spectrum generator 60.

Figure 3:
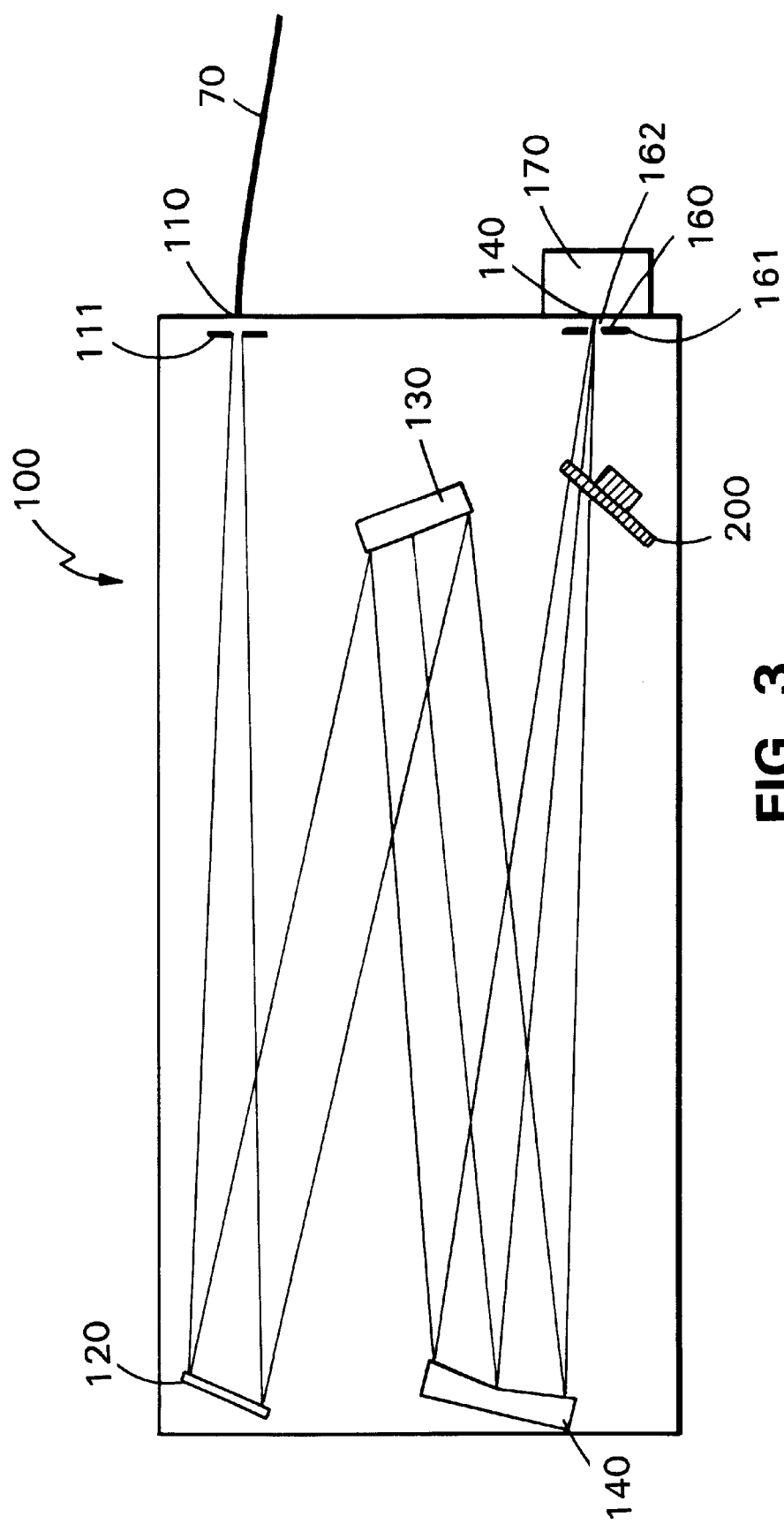
FIG. 3 is an over head view of a spectrometer.

Referring to FIG. 3, spectrometer 100 includes an input 110, a collimating mirror 120, a grating 130, a focusing mirror 140, an output 160, modulator 200, and detector 170. Light transmitted through transmission line 70 is imaged onto entrance slit 111 of input 110, enters spectrometer 100 and is deflected by collimating mirror 120 towards grating 130. Grating 130 resolves the transmitted light into its spectral components by angularly diffracting the light, by wavelength, towards focusing mirror 140. Focusing mirror 140 images light of a particular wavelength bandwidth through modulator 200 and an opening 162 of exit slit 161 of output 160, and onto detector 170. A wavelength (or frequency) bandwidth region could include a range of different wavelengths (or frequencies) or the instrument defined bandwidth of a single wavelength (or frequency). The wavelength bandwidth imaged through spectrometer 100 and onto detector 170 depends upon the resolving power of grating 130, the pathlength between grating 130 and output 160, and the width of entrance and exits slits 111, 161. An example of a spectrometer can be found in "Spectroscopic diagnostics of an atmospheric microwave plasma for monitoring metals pollution," by Woskov et al. and published in the Review of Scientific Instruments 70:489–492 (1999).

Figure 4A:
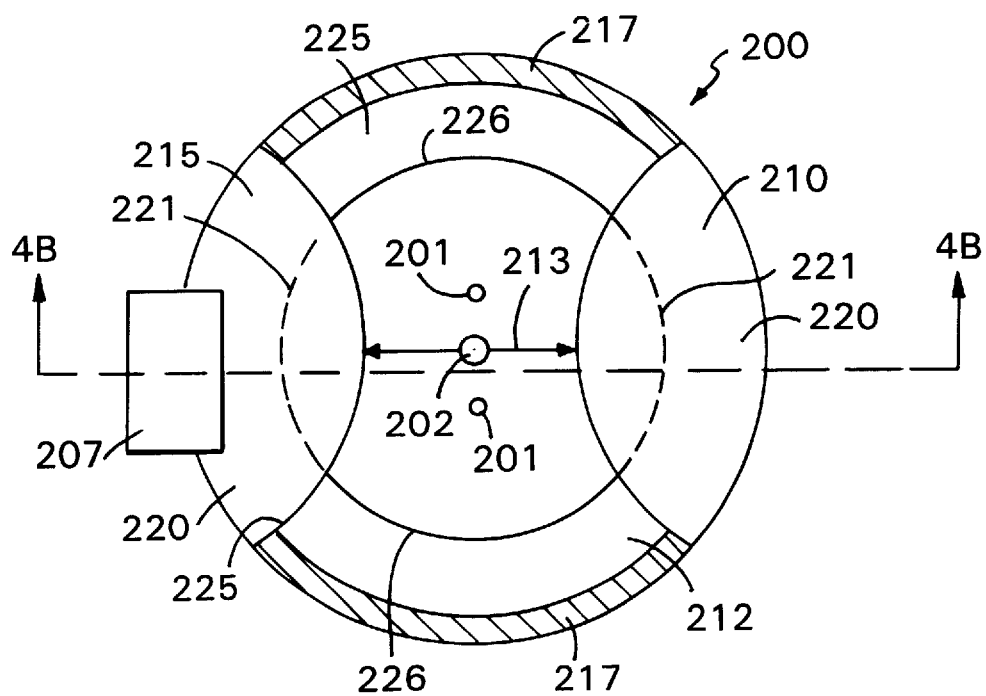
FIG. 4A is a front view of a modulator.
Figure 4B:
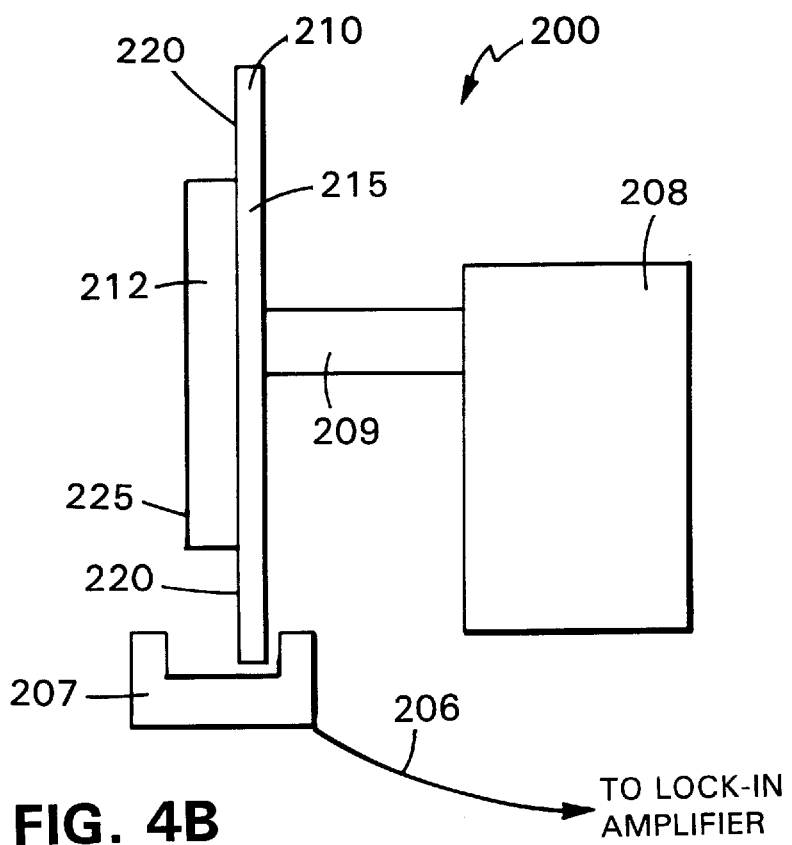
FIG. 4B is a end-on cross-sectional view of the modulator in FIG. 4A about line segment 4B—4B.

Referring now to FIGS. 4A and 4B, modulator 200 includes a modulating blade 210 mounted on a shaft 209 rotatable by a motor 208. Blade 210 includes an hour-glass shaped member 212 and a disc member 215. Both hour-glass and disc members 212, 215 are made from a material that optically transmits the encoded light signal. For example, members 212, 215 are made of quartz or fused silica when the light signal includes wavelengths between about 200 and about 900 nm. Members 212, 215 are oriented with respect to each other, to create a thin regions 220 and a thick regions 225. Hour-glass and disc members 212, 215 are press-fit together and removably attached to shaft 209 by bolts 201. Blade 210 is centered about shaft 209 via a center hole 202 which receives a centering portion of shaft 209 (not shown). Blade 210 also includes an opaque region 217 which periodically passes through a sensor 207. Opaque region 217 can be produced, for example, by applying a black or otherwise opaque paint or tape, to either member 212 or 215. As motor 208 rotates shaft 209 and thereby blade 210, sensor 207 senses the frequency at which blade 210 rotates between the thin and thick regions and generates a frequency reference signal 206 which is sent to lock-in amplifier 180. Sensor 207 includes an infrared (IR) emitting diode and detector. Sensor 207 is oriented such that emission from the diode is directed through blade 210 onto the detector which converts the emission into an electrical signal. As blade 210 rotates, opaque regions 217 periodically block the IR light from impinging onto the detector. As a result, the electrical signal output from the detector exhibits a periodicity proportional to the frequency at which blade 210 rotates.

Figure 5A:
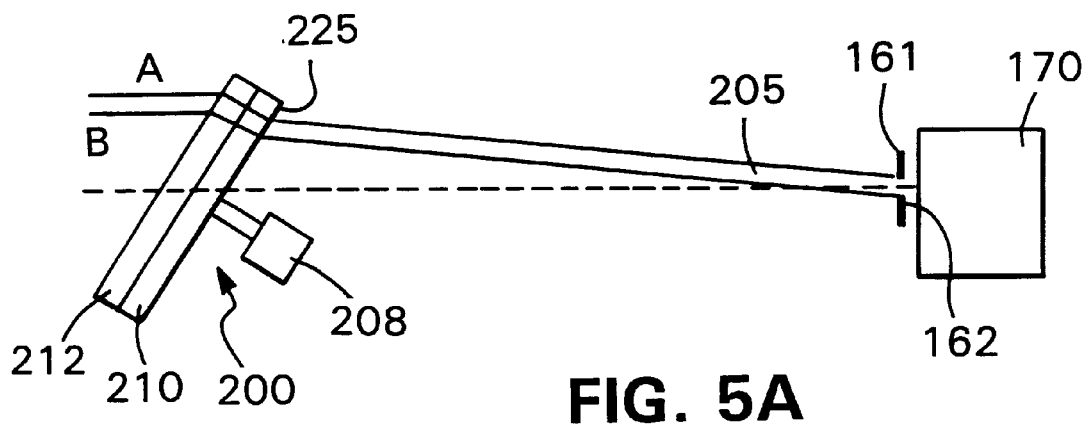
FIGS. 5A and 5B are schematics of the modulator alternatively imaging a light signal containing contaminant emission onto and off a detector.
Figure 5B:
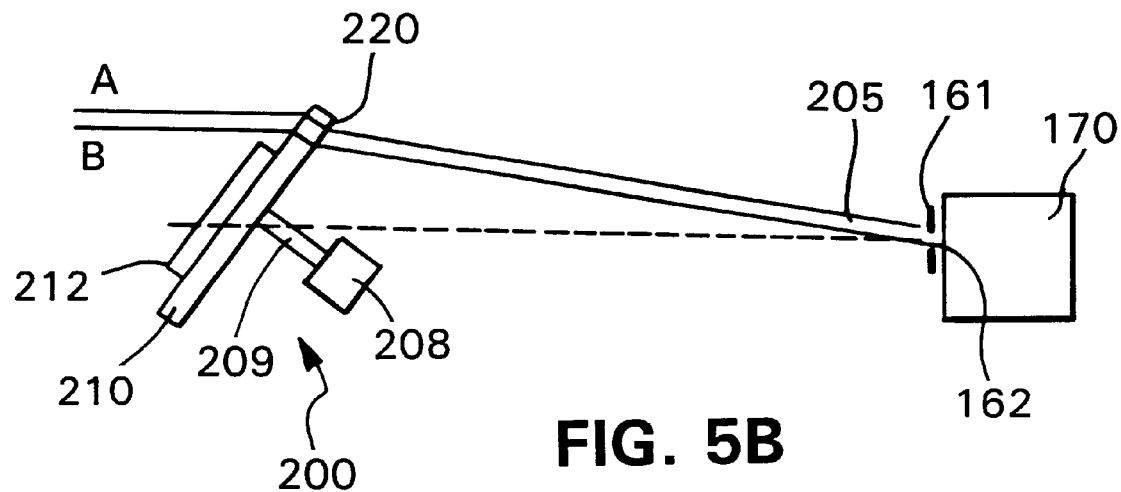

Referring to FIGS. 5A and 5B, blade 210 is positioned at an angle relative to the propagation direction (dashed line) of the light signal, i.e., the direction of light propagation is not perpendicular to the disc. In operation, as the motor of modulator 200 rotates blade 210, the light signal sequentially passes through thick region 225 and thin region 220. As the light signal passes through thin and thick regions 220, 225 the amount of refraction, or distance by which the transmitted light is displaced, varies periodically. The periodic change in refraction or displacement causes specific wavelengths of the light signal to be imaged, alternatively, onto and off of detector 170. The duty cycle or the ratio of time at which the light signal passes through thin and thick regions 220, 225 is about 1:1. A duty cycle of 1:1, typically, is obtained by forming blade 210 such that the circumferences 221 and 226 of thin and thick regions 220, 225 in regions at which the light signal is transmitted through the blade are similar in length (FIG. 4A). For ease of viewing, FIGS. 5A and 5B only show the optical path of a light signal 205 corresponding, for example, to a wavelength bandwidth containing background signal and emission from the contaminants. In this example, light signal 205 is imaged onto detector 170 when modulator blade 210 is oriented such that the light signal passes through thick region 225 (FIG. 5A). As modulator blade 210 rotates thin region 220 into the path of the light signal, the amount of displacement of the light signal is smaller thereby causing the light signal to move off of detector 170 and onto exit slits 161 (FIG. 5B), i.e., the light signal no longer passes through opening 162. In this orientation of blade 210, a light signal of a different wavelength region (not shown) is imaged through opening 162 and onto detector 170. Typically, the amount of displacement caused by blade 210 is large enough to image, alternatively, different wavelength regions with and without contaminant emission onto detector 170. As blade 210 rotates thin region 220 into the optical path, the center wavelength of light signal 205 moves off of detector 170 by about 10 times the width of opening 162. The total amount by which the light signal is displaced relative to detector 170 depends on the wavelength of the light signal, the difference in thickness between thin region 220 and thick region 225, the difference in index of refraction between disc members 212, 215, the angle of the blade 210 relative to light signal 205, and the distance between detector 170 and blade 210.

In a particular embodiment for detecting contaminant emission at about 253.7 nm (corresponding from emission from mercury), a quartz disc member 215 has a thickness of about 1 mm and a diameter of about 1.2 inches and quartz hour-glass member 212 has a thickness of about 3 mm, a diameter of about 1.1 inches in the widest dimension, and a width at waist 213 of about 0.375 inches. The radius of curvature of hour-glass member 212 is about 1.1 inches. Two bolt holes for receiving bolts 201 have a diameter of about 0.01 inch and are spaced apart on opposite sides of a 0.1 center hole 202 by about 0.1 inch. The index of refraction of quartz at 254 nm is about 1.52. Blade 210 is oriented at about 35 degrees relative to the light signal and is about 30 mm away from detector 170 along the optical path. Of course, modulator 200 can be oriented in the optical path such that thin region 220 causes contaminant emission, i.e., light signal 205, to be imaged onto detector 170 and thick region 225 causes displacement off of detector 170. The spectrometer, a 0.5 meter Thermal Jarrell-Ash spectrometer model MonoSpec 50 (Franklin, Mass.), includes a 2400 groove/mm grating. Similar spectrometers can be purchased, for example, from Roper Scientific, located in Acton, Mass. The entrance and exit slit widths of the spectrometer, when set to about 50 microns, allow a wavelength range of about 0.1 nm to be imaged through the exits slits and onto the detector. In this configuration, contaminant emission at about 253.7 nm±about 0.05 nm can be imaged through the exits slits. Blade 210 periodically refracts the contaminant emission at about 253.7 nm by about 10 times the exit slit width, e.g. by about 500 microns which corresponds to a shift in wavelength of about 1.0 nm, such that radiation at about 254.7±about 0.05 nm or about 252.7 nm±about 0.05 nm is periodically imaged onto the detector.

Figure 6:
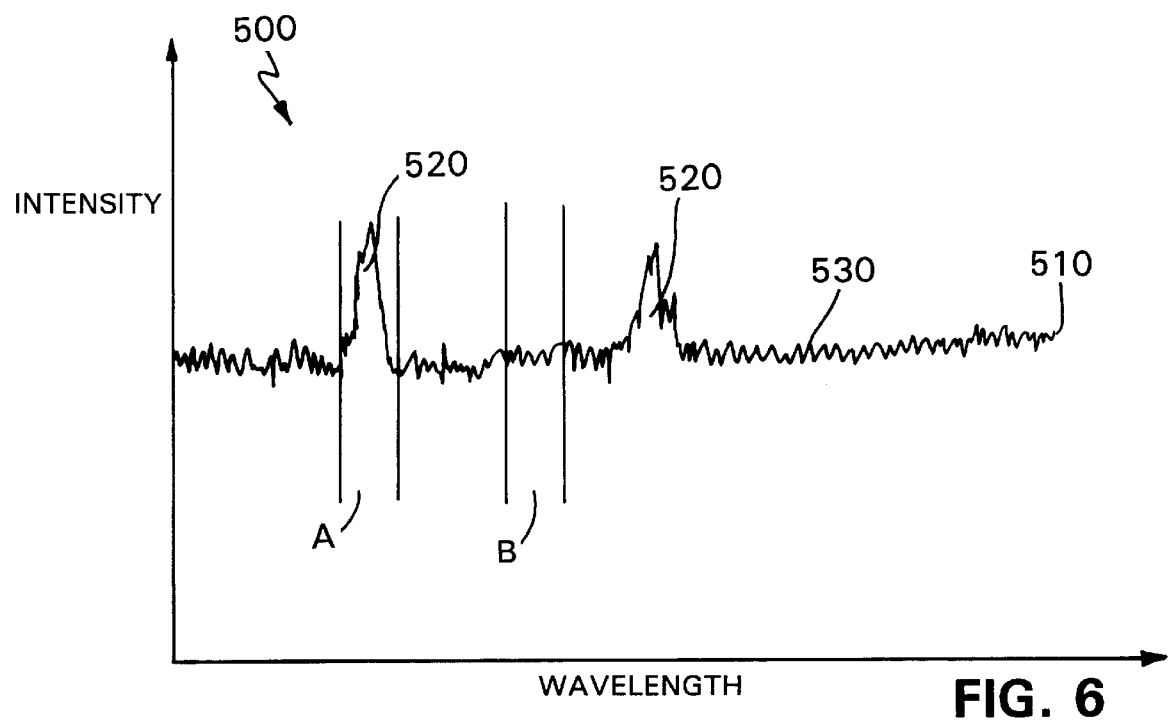
FIG. 6 is an illustration of a light signal containing a background signal, contaminant emission, and random noise.

Referring to FIG. 6, a light signal 500, drawn for illustrative purposes only, is a sum of the background signal 510 primarily from the spectrum generator, contaminant emission features 520 from contaminants in the sample, and a background signal of random noise 530 primarily from random noise in the detection electronics. As described above, modulator 200 alternately images different spectral regions, e.g., regions A (containing a contaminant emission feature, background signal, and random noise) and B (containing background signal and random noise), onto the detector to produce a periodic electronic signal. The periodicity of the electronic signal is related to the modulating cycle or frequency at which the modulator alternates regions A and B onto the detector. The lock-in amplifier uses the reference frequency signal from the modulator to generate a difference signal between regions A and B. With the background level approximately constant over each modulating cycle, the difference signal, i.e., region A minus region B, is proportional to the intensity of the contaminant emission feature in region A plus the random noise. In addition, the modulating cycle can be shorter than the time scale at which background signal 510 changes. Typically, the modulating cycle is greater than 10 Hz, e.g., 200 Hz. In general, the modulation cycle should be about 10 times greater than variations in the background signal. In situations where motor 208 is operating at its maximum speed, increasing the number of thick and thin regions on blade 210 further increases the modulating cycle. Increasing the modulating cycle increases the discrimination of background variations occurring at higher frequencies. Using a lock-in amplifier to detect emission signals, lowers the detection limits, at which contaminant emissions are monitored. For example, spectrometer 100 may be used to detect presence atomic elements in a sample at concentrations less than about 1 $\mu$g/m$^3$.

Figure 7:
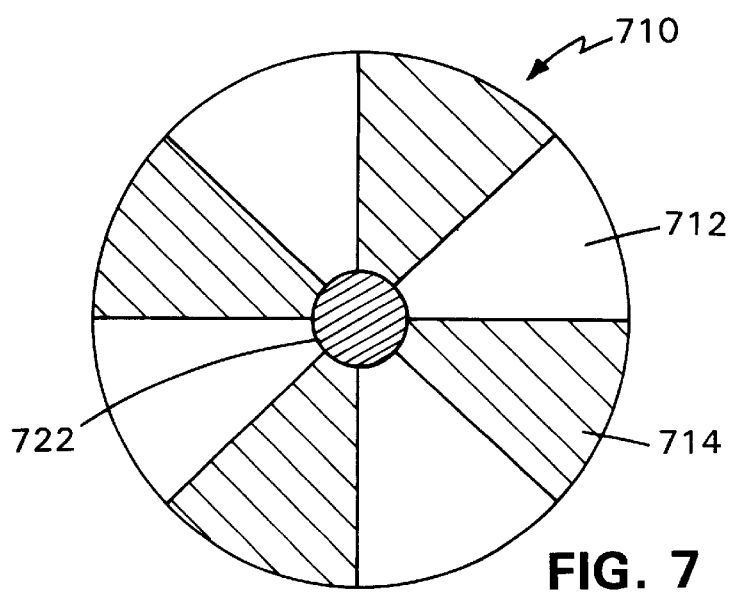
FIG. 7 is a front view of an alternative modulator.

Referring to FIG. 7, in an alternative embodiment, a modulator includes a blade 710 made of optically transmissive materials having different indices of refraction. For example, regions 712 have an index of refraction less than regions 714. Accordingly, a light signal passing through region 712 will be refracted less than the same light signal passing through region 714. The difference in refraction between the two regions alternates different spectral regions onto a detector. In this situation, the thickness of regions 712, 714 also can be adjusted such that each region absorbs the light signal in approximately equal amounts. Equalizing the absorption in each region results in a difference signal that is linearly proportional to the amount of contaminant in the sample. Blade 710 is constructed by securing the vertices of pie-shaped regions 712, 714 in a compression nut 722. Alternatively, blade 710 can be constructed by applying adhesive to adjacent edges of pie-shaped regions 712, 714 and assembling the regions edge-to-edge to form a disc which is attached to the motor via nut 722. In further embodiments, more than two spectral regions may be monitored by including three or more regions in blade 710 which have different reflective characteristics, e.g., thickness and/or reflective index. In addition, the angular relationship of the regions can be varied by tilting different regions of the blade, resulting in a non-planar disk, to produce varying degrees of refraction.

Figure 8:
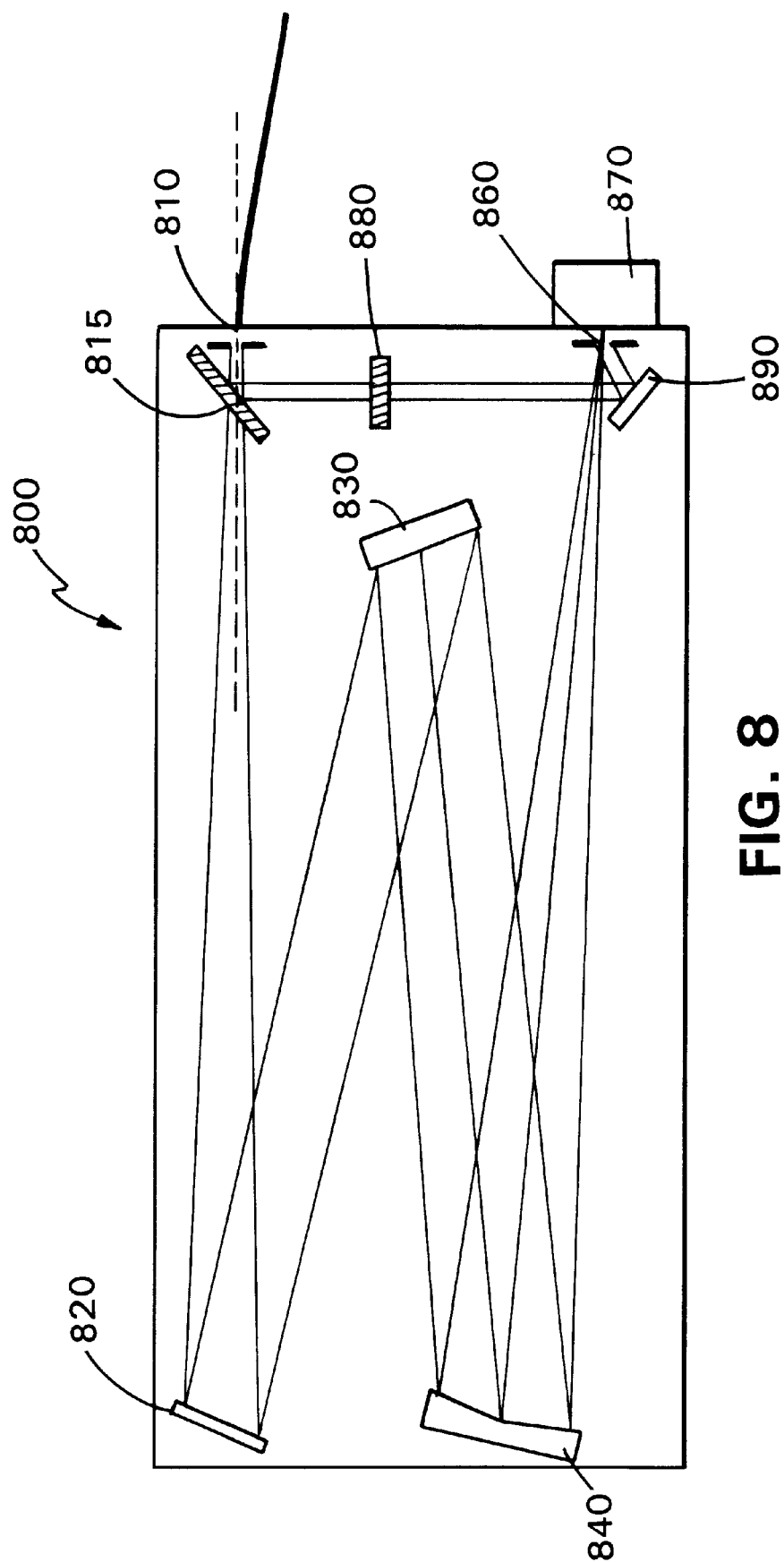
FIG. 8 is an over head view of an alternative spectrometer useful in monitor contaminant emission.
Figure 9:
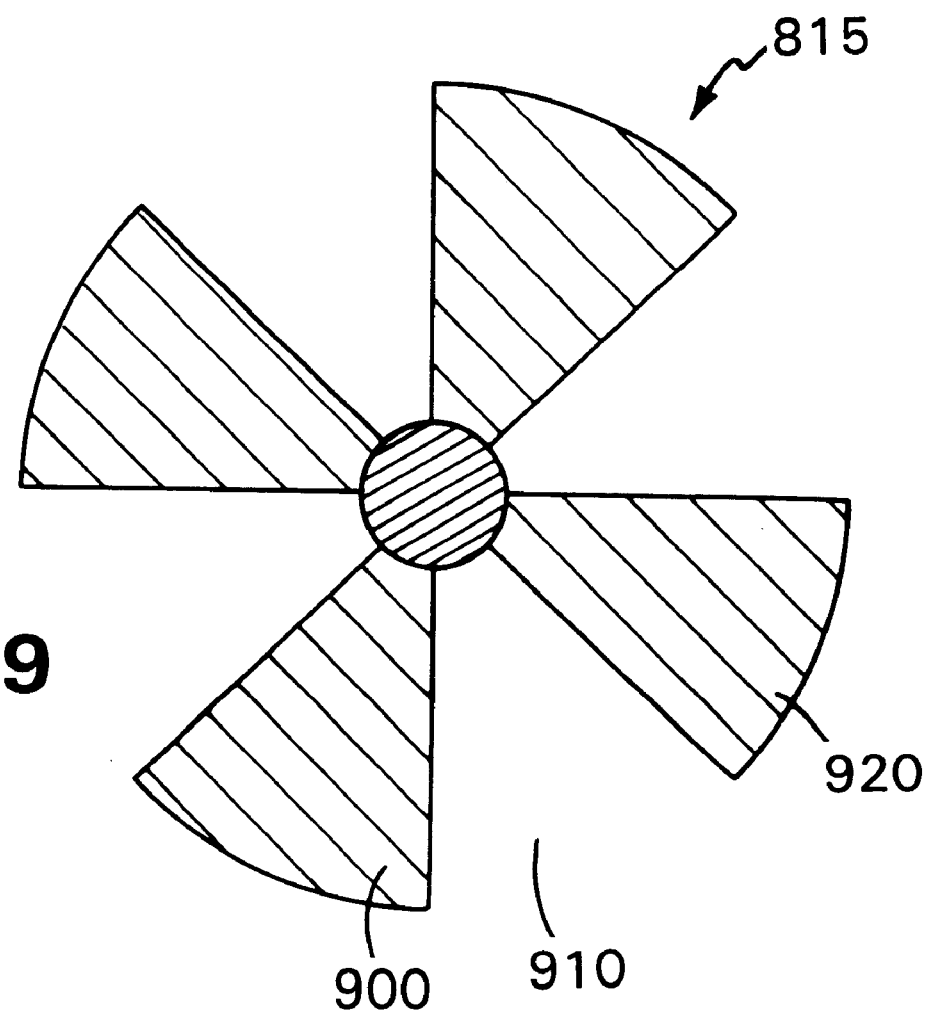
FIG. 9 is a front view of the modulating blade used in the spectrometer of FIG. 8.

In an alternative embodiment shown in FIGS. 8 and 9, spectrometer 800 includes an input 810, a modulator 815, a collimating mirror 820, a grating 830, a focusing mirror 840, an output 860, a detector 870, an attenuator 880, and a turning mirror 890. Modulator 815 includes a blade 900 having transmissive regions 910 and reflective regions 920. Typically, blade 900 is made from aluminum or coated glass. Transmissive regions 910 are created by removing blade material and reflective regions 920 are created by coating the remaining blade material with a highly reflective material such as gold or silver. Alternatively, blade 900 can be a disc of fused quartz having reflective material coated thereon to produce reflective regions 920.

Blade 900 is orientated relative to the optical path (dashed line) of the light signal entering spectrometer 800 so as to reflect periodically the entire, i.e., undispersed, light signal from the transmission line toward detector 870. In operation, the light signal imaged into spectrometer 800 is alternately directed either through the dispersing optics, i.e., a collimating mirror 820, a grating 830, a focusing mirror 840, when transmissive regions 910 are in the optical path or through attenuator 880 and turning mirror 890 when reflective regions 920 are in the optical path. Attenuator 880 reduces the intensity of the undispersed light signal such that the intensity level of the undispersed light signal is approximately equal to the intensity of the light signal without contaminants sent through dispersing optic and onto detector 870, i.e., the dispersed signal. The amount by which attenuator 880 attenuates the undispersed light signal can be calibrated by imaging a light signal free of contaminant emission into spectrometer 800. The attenuator is adjusted until the intensity of both the undispersed and the dispersed light signals are the same. The attenuator is a partially transmitting material, such as a neutral density filter. Of course, the undispersed light signal contains both the background signal and contaminant emission during normal operation. However, since the undispersed light signal is many orders of magnitude wider in bandwidth than the dispersed light signal, the presence of contaminant emission in the undispersed light signal is almost negligible. As a result, the undispersed light signal is approximately equivalent to the background signal without the contaminant emission and the difference signal generated by the lock-in amplifier is linearly proportional to the amount of contaminant in the sample. The amount of contaminant emission in the undispersed signal can be less than about 1 part per billion.

In yet another embodiment, a monitoring apparatus monitors absorption spectra of a sample stream, such as effluent from a smokestack, for the presence of contaminants. The contaminants include, but are not limited to, any element, compound, or composition that absorbs a characteristic light signal. Absorption spectra of a sample stream are generated by passing the sample stream through a spectrum generator which includes a white light source to produce a light signal encoded with spectroscopic information about the sample stream, i.e., contaminants absorb specific wavelengths of the white light. The light signal is passed through a transmission line, e.g., lenses, mirrors, and/or fiber optic cables, and monitored by a spectrometer. A decrease in the amount of the light signal measured in a frequency range characteristic of contaminants absorption can be used to monitor the level of contaminants in the sample stream. In further embodiments, the modulator blades described above can be used with a multi-band spectrometer described in "Spectroscopic diagnostics of an atmospheric microwave plasma for monitoring metals pollution," by Woskov et al. and published in the Review of Scientific Instruments 70:489–492 (1999).

Still further embodiments are in the following claims.

What is claimed is:

1. A spectroscopic device, comprising:
   dispersing optics arranged to disperse electromagnetic radiation,
   a detector arranged to measure electromagnetic radiation,
   a transmissive rotating blade positioned to receive electromagnetic radiation dispersed by the dispersing optics and to cause different frequency ranges of the electromagnetic radiation to move onto and off of the detector, and
   detector electronics that monitor an electromagnetic radiation signal at a first frequency range while correcting a background contribution using an electromagnetic radiation signal at a second frequency range.

2. The spectroscopic device of claim 1, wherein the transmissive rotating blade includes a first portion and a second portion having different thicknesses.

3. The spectroscopic device of claim 2, wherein the first and the second portions have the same refractive index.

4. The spectroscopic device of claim 2, wherein the first and second portions have different refractive indices.

5. The spectroscopic device of claim 1, wherein the transmissive rotating blade includes material free portions which pass electromagnetic radiation without refraction.

6. The spectroscopic device of any one of claims 2–5, wherein at least a portion of the transmissive rotating blade is formed of quartz.

7. The spectroscopic device of any one of claim 6, wherein the transmissive rotating blade includes multiple stacked quartz sections of different shapes to create regions of the blade having different thicknesses.

8. The spectroscopic device of claim 1, wherein the detector electronics include a lock-in amplifier.

9. The spectroscopic device of claim 8, wherein the detector electronics further include a sensor configured to measure the frequency at which the transmissive rotating blade moves the different frequency ranges onto and off of the detector.

10. The spectroscopic device of claim 9, wherein the lock-in amplifier is configured to receive signals from the sensor and the detector.

11. The spectroscopic device of claim 1, further including a transfer line configured to transmit the electromagnetic radiation from a radiation source to the dispersing optics.

12. The spectroscopic device of claim 1, wherein the transmissive rotating blade rotates at a frequency sufficient to reduce the background contribution.

13. The spectroscopic device of claim 1, wherein the electromagnetic radiation signal at the first frequency range includes contributions from contaminant emission and background emission.

14. The spectroscopic device of claim 13, wherein the electromagnetic radiation signal at the second frequency range includes contributions from background emission.

15. The spectroscopic device of claim 1, further including an emission spectrum generator.

16. The spectroscopic device of claim 1 arranged to receive electromagnetic radiation from combustion effluent.

17. The spectroscopic device of claim 1 arranged to detect electromagnetic radiation emitted from metals.

18. A spectroscopic device, comprising:
   dispersing optics arranged to disperse electromagnetic radiation,
   a detector arranged to measure electromagnetic radiation,
   a reflective rotating blade before the dispersing optics that causes different frequency ranges of electromagnetic radiation to move onto and off of the detector, an attenuator between the reflective rotating blade and the detector arranged to control the intensity of the electromagnetic radiation directed onto the detector, and detector electronics that monitor an electromagnetic radiation signal at a first frequency range while correcting a background contribution using an electromagnetic radiation signal at a second frequency range.

19. The spectroscopic device of claim 18, wherein the reflective rotating blade includes a transmissive first portion and a reflective second portion.

20. The spectroscopic device of claim 18, wherein the reflective rotating blade includes material free portions which pass radiation without refraction.

21. The spectroscopic device of claim 18, wherein the detector electronics include a lock-in amplifier.

22. The spectroscopic device of claim 21, wherein the detector electronics further include a sensor configured to measure the frequency at which the reflective rotating blade moves the alternate frequency ranges onto and off of the detector.

23. The spectroscopic device of claim 22, wherein the lock-in amplifier is configured to receive electric signals from the sensor and the detector.

24. The spectroscopic device of claim 18, further including a transfer line configured to transmit the electromagnetic radiation from a radiation source to the dispersing optics.

25. The spectroscopic device of claim 18, wherein the reflective rotating blade rotates at a frequency sufficient to reduce the background contribution.

26. The spectroscopic device of claim 18, wherein the electromagnetic radiation signal at the first frequency range includes contributions from contaminant emission and background emission.

27. The spectroscopic device of claim 26, wherein the electromagnetic radiation signal at the second frequency range includes the electromagnetic radiation signal at the first frequency range.

28. The spectroscopic device of claim 18, further including an emission spectrum generator.

29. The spectroscopic device of claim 18 arranged to receive electromagnetic radiation from combustion effluent.

30. The spectroscopic device of claim 18 arranged to detect electromagnetic radiation emitted from metals.

31. A spectroscopic device, comprising:
dispersing optics arranged to disperse electromagnetic radiation,
a detector arranged to measure the electromagnetic radiation,
a movable transmissive element having different portions that cause by a difference in the refraction between the different portions different frequency ranges of the electromagnetic radiation incident on the different portions to move on to and off of the detector, and
detector electronics that monitor an electromagnetic radiation signal at a first frequency range while correcting a background contribution using an electromagnetic radiation signal at a second frequency range.

32. The spectroscopic device of claim 31, wherein the movable transmissive element includes a first portion and a second portion having different thicknesses.

33. The spectroscopic device of claim 32, wherein the first portion and the second portion are made of the same material.

34. The spectroscopic device of claim 31, wherein the movable transmissive element includes material free portions which pass radiation without refraction.

35. The spectroscopic device of claim 31, wherein the movable transmissive element includes a first portion and a second portion having different indices of refraction.

36. The spectroscopic device of claim 31, wherein the moveable transmissive element includes a first portion and a second portion having different angular orientations with respect to the electromagnetic radiation.

37. The spectroscopic device of claim 31, wherein the detector electronics include a lock-in amplifier.

38. The spectroscopic device of claim 37, wherein the detector electronics further include a sensor configured to measure the frequency at which the movable transmissive element moves the different frequency ranges onto and off of the detector.

39. The spectroscopic device of claim 38, wherein the lock-in amplifier is configured to receive electric signals from the sensor and the detector.

40. The spectroscopic device of claim 31, further including a transfer line configured to transmit the electromagnetic radiation from a radiation source to the dispersing optics.

41. The spectroscopic device of claim 31, wherein the movable transmissive element alternates the frequency ranges of the electromagnetic radiation signal at a rate sufficient to reduce the background contribution.

42. The spectroscopic device of claim 31, wherein the electromagnetic radiation signal at the first frequency range includes contributions from contaminant emission and background emission.

43. The spectroscopic device of claim 42, wherein the electromagnetic radiation signal at the second frequency range includes contributions from background emission.

44. The spectroscopic device of claim 31, further including an emission spectrum generator.

45. The spectroscopic device of claim 31 arranged to receive electromagnetic radiation from combustion effluent.

46. The spectroscopic device of claim 31 arranged to detect optical radiation from metals.

47. A spectroscopic device, comprising:
dispersing optics arranged to disperse electromagnetic radiation,
a detector arranged to measure electromagnetic radiation,
a transmissive rotating blade that causes different frequency ranges of the electromagnetic radiation to move onto and off of the detector, wherein the transmissive rotating blade includes a first portion and a second portion having different thicknesses, and
detector electronics that monitor an electromagnetic radiation signal at a first frequency range while correcting a background contribution using an electromagnetic radiation signal at a second frequency range.

48. The spectroscopic device of claim 47, wherein the first and the second portions have the same refractive index.

49. The spectroscopic device of claim 47, wherein the first and the second portions have different refractive indices.

50. The spectroscopic device of claim 47, wherein the transmissive rotating blade includes material free portions which pass electromagnetic radiation without refraction.

51. The spectroscopic device of any one of claims 47–50, wherein at least a portion of the transmissive rotating blade is formed of quartz.

52. The spectroscopic device of any one of claim 51, wherein the transmissive rotating blade includes multiple stacked quartz sections of different shapes to create regions of the blade having different thicknesses.

53. The spectroscopic device of claim 47, wherein the detector electronics include a lock-in amplifier.

54. The spectroscopic device of claim 53, wherein the detector electronics further include a sensor configured to measure the frequency at which the transmissive rotating blade moves the different frequency ranges onto and off of the detector.

55. The spectroscopic device of claim 54, wherein the lock-in amplifier is configured to receive signals from the sensor and the detector.

* * * * *